United States Patent
Rauch et al.

(10) Patent No.: US 12,240,377 B2
(45) Date of Patent: Mar. 4, 2025

(54) VEHICLE WINDOW COMPRISING AN ILLUMINATING DEVICE AND A LIGHT-DECOUPLING DEVICE

(71) Applicant: Webasto SE, Stockdorf (DE)

(72) Inventors: Christian Rauch, Stockdorf (DE); Stefan Groitl, Stockdorf (DE); Stefan Schmuck, Stockdorf (DE); Jan Grothe, Stockdorf (DE); Rudolf Dietl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/630,461

(22) Filed: Apr. 9, 2024

(65) Prior Publication Data
US 2024/0343187 A1    Oct. 17, 2024

(30) Foreign Application Priority Data
Apr. 11, 2023    (DE) ............ 10 2023 109 096.8

(51) Int. Cl.
*B60Q 3/66*    (2017.01)
*B32B 17/10*    (2006.01)
(Continued)

(52) U.S. Cl.
CPC .......... *B60Q 3/66* (2017.02); *B32B 17/10036* (2013.01); *B32B 17/10495* (2013.01);
(Continued)

(58) Field of Classification Search
CPC .... B60Q 3/66; B60Q 3/208; B32B 17/10036; B32B 17/10495; B32B 17/10541; B32B 17/10568; B32B 17/1077; G02B 6/0036
See application file for complete search history.

(56) References Cited

U.S. PATENT DOCUMENTS

2015/0298601 A1    10/2015    Bott
2023/0118480 A1    4/2023    Pasquarelli
(Continued)

FOREIGN PATENT DOCUMENTS

DE    102012215640 A1    3/2014
DE    102012109900 A1    4/2014
(Continued)

OTHER PUBLICATIONS

Office Action issued against corresponding German Application No. 10 2023 109 096.8; mailed Jan. 15, 2024 in German with English Translation (14 pages).

*Primary Examiner* — Christopher E Dunay
(74) *Attorney, Agent, or Firm* — Fitch, Even, Tabin & Flannery, LLP

(57) ABSTRACT

A vehicle window includes a window body assembly having at least one window body, the window body assembly having an outer side facing the vehicle environment and an inner side facing the vehicle interior and a light-conducting layer forming the inner side; an illuminating device configured to couple light into the light-conducting layer; and a light-decoupling device configured to decouple light from the light-conducting layer in the direction of the vehicle interior. The light-decoupling device includes transparent structural elements made of a polymer material and molded or connected to the inner side of the window body assembly by extrusion or foaming or injection molding or gluing.

9 Claims, 2 Drawing Sheets

(51) Int. Cl.
*B60Q 3/208* (2017.01)
*F21V 8/00* (2006.01)
*B62D 25/06* (2006.01)

(52) U.S. Cl.
CPC .. *B32B 17/10541* (2013.01); *B32B 17/10568* (2013.01); *B32B 17/1077* (2013.01); *B60Q 3/208* (2017.02); *G02B 6/0036* (2013.01); *B32B 2605/00* (2013.01); *B62D 25/06* (2013.01)

(56) References Cited

U.S. PATENT DOCUMENTS

| | | | |
|---|---|---|---|
| 2023/0400619 A1* | 12/2023 | Ma | B32B 17/10623 |
| 2024/0004121 A1* | 1/2024 | Kingman | G02B 6/0051 |
| 2024/0004125 A1* | 1/2024 | Kingman | B32B 17/10504 |
| 2024/0101022 A1* | 3/2024 | Goetzelmann | B60R 13/005 |
| 2024/0131822 A1* | 4/2024 | Gomer | B32B 17/1077 |
| 2024/0255692 A1* | 8/2024 | Ye | B60J 1/001 |

FOREIGN PATENT DOCUMENTS

| | | |
|---|---|---|
| DE | 202015104882 U1 | 12/2016 |
| DE | 102020109338 B3 | 5/2021 |
| EP | 2543540 A1 | 1/2013 |

* cited by examiner

VEHICLE WINDOW COMPRISING AN ILLUMINATING DEVICE AND A LIGHT-DECOUPLING DEVICE

CROSS-REFERENCE TO RELATED APPLICATION(S)

This application claims the benefit DE 10 2023 109 096.8 filed Apr. 11, 2023, which is incorporated herein by reference in its entirety.

TECHNICAL FIELD

The invention relates to a vehicle window including a window body assembly having at least one window body, the window body assembly having an outer side facing the vehicle environment and an inner side facing the vehicle interior and a light-conducting layer forming the inner side; an illuminating device configured to couple light into the light-conducting layer; and a light-decoupling device configured to decouple light from the light-conducting layer in the direction of the vehicle interior.

BACKGROUND

A vehicle window of this kind is known from DE 10 2020 109 338 B3 and can be a component of a fixed roof element or a lid element of a roof opening system, by means of which a roof opening can be optionally closed or opened. The vehicle window comprises a window body assembly which comprises an outer window body, which has an outer side facing a vehicle environment, and an inner window body, which has an inner side facing a vehicle interior, the inner window body being connected to the outer window body via a connecting layer and forming a light-conducting layer. A prism-like light-coupling element is connected to the inner side formed by the inner window body, the light-coupling device being configured to couple light emitted by an illuminating device into the inner window body by appropriate deflection. In order to provide the vehicle window with an ambient light functionality, printed structures are disposed on the side of the inner window body facing the outer window body, the printed structures serving as scattering elements and enabling the light to be coupled out of the inner window body in the direction of the vehicle interior. This light-decoupling device can impair the quality of the material bond between the outer window body and the inner window body.

SUMMARY

The object of the invention is to provide a vehicle window of the type mentioned at the beginning which is provided with a light-decoupling device that offers a wide range of design options.

According to the invention, this object is attained by the vehicle window having the feature that the light-decoupling device comprises transparent structural elements made of a polymer material and molded or connected to the inner side of the window body assembly by extrusion or foaming or injection molding or gluing.

So the invention proposes a vehicle window comprising a window body assembly having at least one window body, the window body assembly having an outer side facing the vehicle environment and an inner side facing the vehicle interior and a light-conducting layer forming the inner side, an illuminating device configured to couple light into the light-conducting layer, and a light-decoupling device configured to decouple light from the light-conducting layer in the direction of the vehicle interior. The light-decoupling device comprises transparent structural elements made of a polymer material and molded or attached to the inner side of the window body assembly by extrusion or foaming or injection molding or gluing.

In the case of the vehicle window according to the invention, plastic elements are thus molded directly onto the light-conducting layer on the inside, the plastic elements forming scattering elements and serving as illuminating elements of the vehicle window when the illuminating device is actuated. By using a polymer material that is extruded, foamed, molded or glued on, it is possible to give the light-decoupling device a geometry that can meet a wide range of design requirements.

The illuminating device of the vehicle window according to the invention comprises, for example, one or more LEDs as the light source: in particular, an LED strip formed as what is referred to as a PCB (printed circuit board) can be provided, which has several LEDs disposed in series one behind the other on a circuit board and configured to couple light into the light-conducting layer.

In principle, of course, the light from the illuminating device can also be coupled in via the edge surface of the light-conducting layer. In this case, special light-coupling elements may be dispensed with.

The window body assembly of the vehicle window according to the invention can be designed as a laminated structure, in particular as laminated safety glass, or also as a single pane or single-pane safety glass.

When using a laminated structure as a window body assembly, an outer window body and an inner window body are preferably provided, the inner window body being connected to the outer window body via at least one connecting layer. The inner window body preferably forms the light-conducting layer into which the light from the illuminating device can be coupled directly or via at least one coupling element. An additional, possibly cost-intensive light-conducting layer is therefore not required. In this case, the light-decoupling device of the vehicle window according to the invention is molded directly onto the inner window body.

In the case of laminated safety glass with an outer window body and an inner window body, it is of course also conceivable for an additional light-conducting layer, which forms the inner side of the laminated structure and into which the light of the illuminating device can be coupled, to be mounted on the inner side of the inner window body.

Furthermore, in particular in the case of a vehicle window used as a roof window, it is advantageous for a light-coupling device having at least one light-coupling element, which acts in the manner of an optical prism and to which at least one light source or LED is assigned and in which the light from the light source is deflected and guided into the light-conducting layer at preferred angles, to be disposed on the light-conducting layer on the inner side at each of two edges of the window body assembly facing away from each other. Furthermore, it is also conceivable for a vehicle window according to the invention which has an essentially rectangular base surface to be provided with a light-coupling device configured as described above along each of three or four edges, the light-coupling device having at least one light-coupling element with at least one light-coupling surface to which a light source is assigned, whereby the luminosity of the assembly can be increased, since light is coupled into the light-conducting layer in a particularly efficient manner and with low losses. This means that a vehicle window having a large surface area can also be provided with an ambient light functionality.

The vehicle window according to the invention can basically be disposed anywhere in a motor vehicle. Preferably, however, the vehicle window is a roof window that forms either a fixed roof element that is disposed rigidly and immovably relative to the vehicle body or a movable lid element of a roof opening system.

In a preferred embodiment of the vehicle window according to the invention, the polymer material of the light-decoupling device is a transparent polyurethane material which has good moldability or processability. Alternatively or additionally, TPV (thermoplastic vulcanizate), PVC (polyvinyl chloride), TPU (thermoplastic polyurethane), TPE (thermoplastic elastomer), EPDM (ethylene propylene diene rubber), TPC (thermoplastic polyester elastomer) or PC (polycarbonate) can be used as the material for the light-decoupling device.

The polymer material can contain additional scattering centers, which can be formed by solids or other inclusions and can give the polymer material special lighting properties. It is also conceivable that the structural elements have a coating and/or a surface structure on their visible surface that supports or causes the decoupling and which may also have edges. The light can be decoupled at an interface between the light-conducting layer and the structural elements and/or at the visible surface of the structural elements.

In a special embodiment of the vehicle window according to the invention, the structural elements comprise ribs, which are preferably aligned parallel to one another. The ribs can be disposed on the inner side of the window body in such a manner that they prevent in particular a head of a vehicle occupant from coming into direct contact with the window body assembly or the light-conducting layer, which can reach high temperatures in particular in strong sunlight. Due to their low thermal conductivity, the ribs can therefore additionally act as a kind of burn protection for the vehicle occupant in question. Polyurethane, for example, has a thermal conductivity of 0.3 W/mk, PVC has a thermal conductivity of 0.17 W/mK, and PC has a thermal conductivity of 0.2 W/mK.

Considering the usual head dimensions of a vehicle occupant or a standardized head circle, which has a diameter of 165 mm, adjacent ribs of the light-decoupling device of the vehicle window according to the invention preferably have a distance of no more than 40 mm, for example from about 12 mm to 35 mm, and in particular from 33 mm to 35 mm.

Furthermore, it is advantageous if the ribs each have a height of at least 2 mm, for example from about 2 mm to 6 mm, preferably from about 3 mm to 4 mm, and/or each have a width of at least 6 mm and in particular of at least 6.9 mm. For example, the rib width is 7 mm.

Furthermore, the ribs can each have a semi-circular, trapezoidal or other cross section.

If the ribs have edges, they are preferably rounded, for example with a radius of curvature of at least 3 mm, in particular of at least 3.2 mm, preferably of at least 5 mm. For example, a radius of curvature of 7 mm is selected.

If the window body assembly of the vehicle window according to the invention has a plurality of window bodies, an electrically switchable shading device can additionally be disposed between the window bodies. The shading device is formed, for example, by a liquid crystal array, in particular an LC array or a PDCL (polymer-dispersed liquid crystal) array, by an SPD (suspended particle device) array or also by an eInk array.

Further advantageous embodiments of the subject matter of the invention are apparent from the description, the drawing and the claims. All combinations of at least two or more features disclosed in the description, the claims and/or the figures fall within the scope of the invention; i.e., each feature mentioned in the description or shown in the figures can in itself be part of the claimed subject matter independently of the further features mentioned in its context.

BRIEF DESCRIPTION OF DRAWINGS

An embodiment example of a vehicle window according to the invention is shown schematically simplified in the drawing and is described in more detail in the following description.

DETAILED DESCRIPTION

Figure 1:
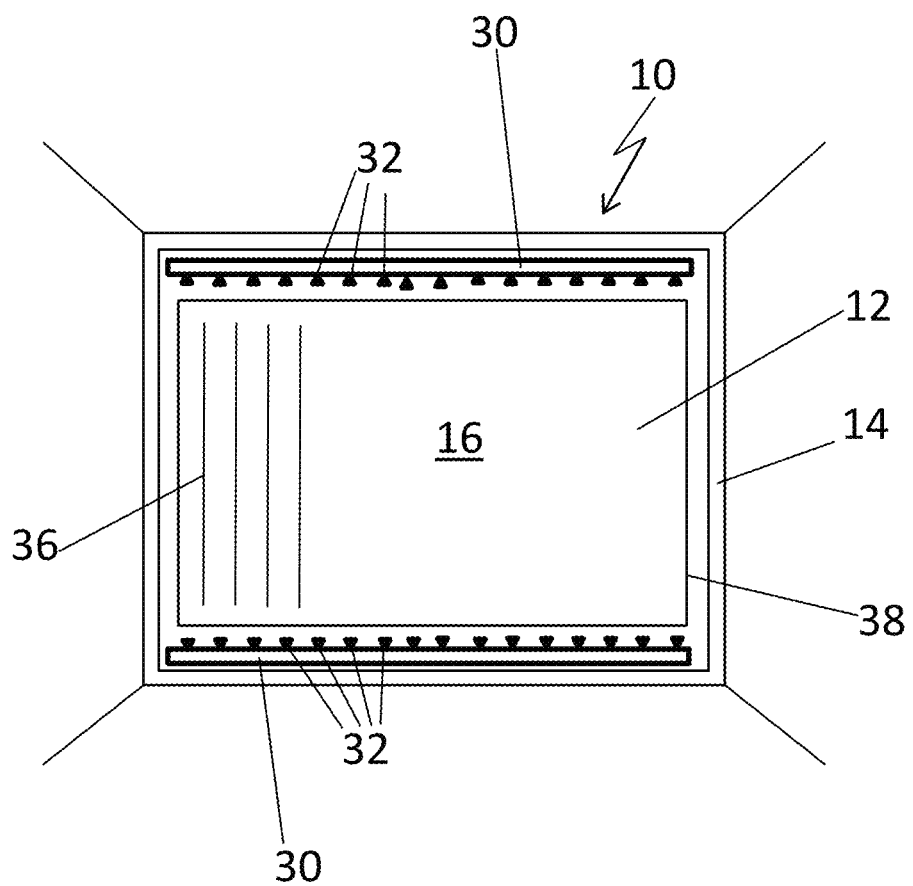
FIG. 1 is a top view of a vehicle roof with a vehicle window according to the invention.
Figure 2:
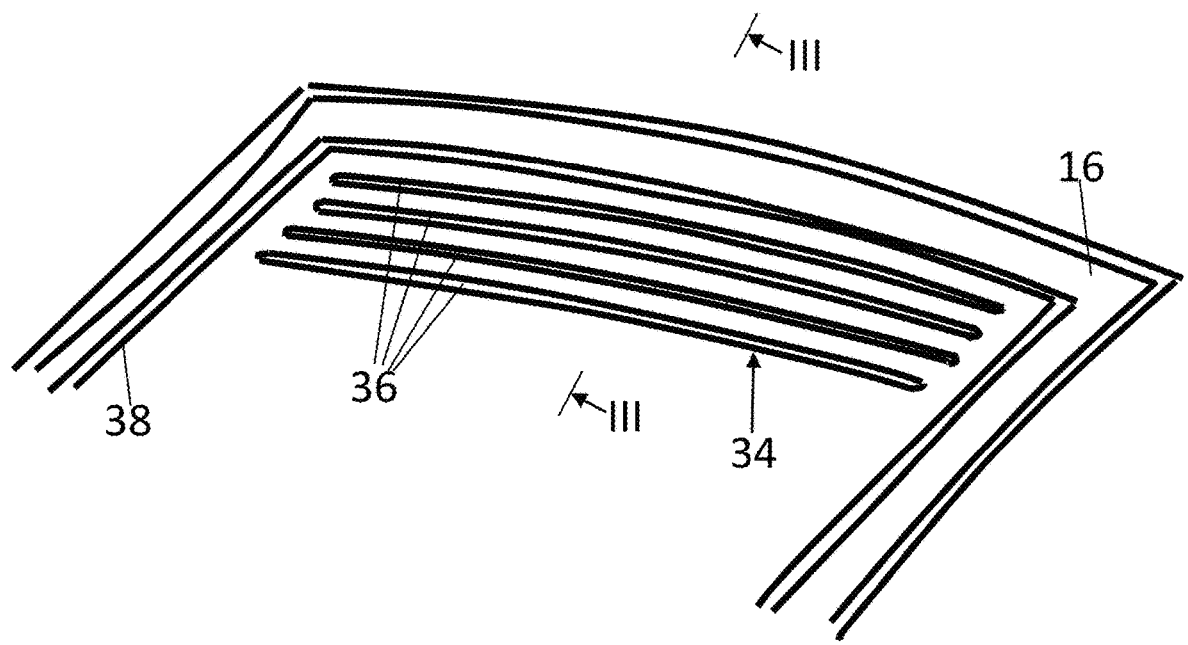
FIG. 2 is a schematic bottom view of the vehicle window.
Figure 3:
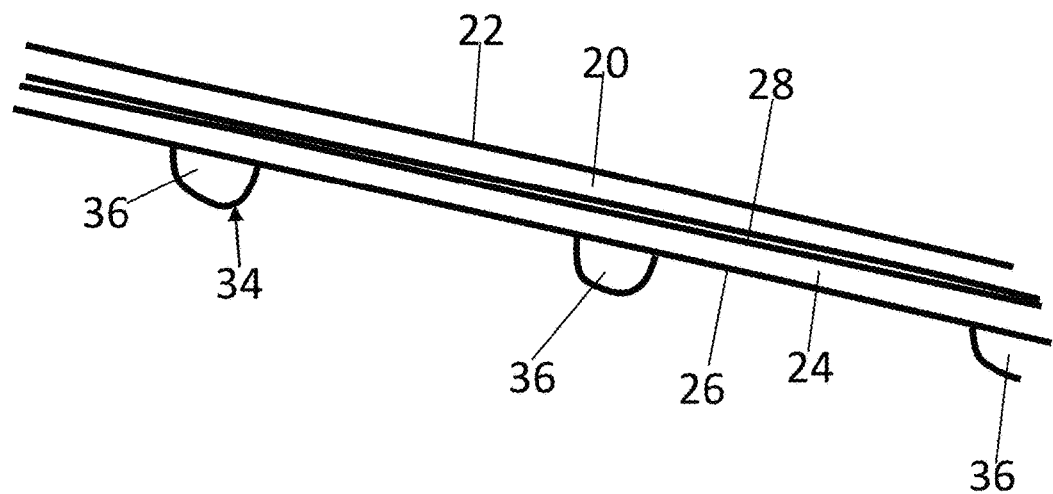
FIG. 3 is a section through the vehicle window along line III-III in FIG. 2.

FIG. 1 shows a vehicle roof 10 of a motor vehicle not otherwise shown in detail. The vehicle roof 10 comprises a fixed roof element 12, which is disposed in a fixed or immovable manner relative to the vehicle body and is rigidly connected to a roof frame 14 for this purpose. To form a panoramic roof, the fixed roof element 12 comprises a vehicle window 16, the structure of which is shown in more detail in FIGS. 2 and 3.

The vehicle window 16 comprises a window body assembly 18, which is a laminated safety glass and has an outer window body 20, which forms an outer side 22 of the window body assembly 18 facing a vehicle environment, and an inner window body 24, which forms an inner side 26 of the window body assembly 18 facing a vehicle interior and is connected to the outer window body 20 via a lamination film 28. An electronically switchable shading device (not shown), which is formed by a liquid crystal arrangement or the like, can also be disposed between the outer window body 20 and the inner window body 24.

The outer window body 20 and the inner window body 24 are each formed by a curved glass plate, which is made, for example, from a colored or uncolored soda-lime glass, or from a curved plastic plate, such as a polycarbonate pane. It is of course also conceivable for the outer window body 20 and the inner window body 24 to be made of differing materials.

The vehicle window 16 is provided with an illuminating device 30 along each of its edges disposed on either side of a vertical longitudinal center roof plane, the illuminating device 30 being an LED strip comprising a flexible backing plate, which is a PCB (printed circuit board) with electronic components. Several LEDs are disposed on the backing plate one behind the other in the longitudinal direction as light sources.

The illuminating devices 30 are each connected to the inner side 26 of the inner window body 24 via a plurality of light-coupling elements 32, which are disposed one behind the other in the longitudinal direction of the vehicle and together form a light-coupling device. The light-coupling elements 32 are of identical design and are each fixed to the inner side 26 of the inner window body 24, i.e., to a large surface of the inner window body 24, via an adhesive layer. Due to their at least partially wedge-like shape, the light-coupling elements 32 each act as an optical prism to which one of the LEDs is assigned, the light of which can be coupled into the inner window body 24 via the inner side 26 by means of the light-coupling element 32. The inner window body 24 thus forms a light-conducting layer of the window body assembly 18.

A plurality of ribs 36 are formed on the inner side 26 of the inner window body 24 or the window body assembly 18 as light-decoupling devices 34, each rib 36 being made of a transparent polyurethane material which is connected to the inner side 26 of the inner window body 24 by extrusion or foaming. The ribs 36 each form a transparent structural element of the light-decoupling device 34 and extend in the transverse direction of the vehicle, adjacent ribs 36 having a distance of approximately 33 mm from one another in the longitudinal direction of the vehicle. Furthermore, the ribs 36, which have an approximately semi-circular cross section, each have a maximum width of approximately 7 mm and a height of approximately 4 mm.

The vehicle window 16 has an additional, frame-like rib 38 on the inner side 26 of the inner window body 24, said rib 38 also being a component of the light-decoupling device 34 and spaced apart from an inner lining (not shown) delimiting the vehicle window 16 at the edge and also covering the light-coupling elements 32.

When the illuminating device 30 is actuated, the light emitted by the LEDs and coupled into the inner window body 24 by means of the light-coupling elements 32 is decoupled by means of the ribs 36 and 38, so they serve as lighting elements of the vehicle window 16.

The ribs 36 and 38 represent contact protection ribs for vehicle occupants, preventing a vehicle occupant's head from inadvertently coming into contact with the possibly heated window body assembly 18.

REFERENCE SIGNS

| 10 | vehicle roof |
| --- | --- |
| 12 | fixed roof element |
| 14 | roof frame |
| 16 | vehicle window |
| 18 | window body assembly |
| 20 | outer window body |
| 22 | outer side |
| 24 | inner window body |
| 26 | inner side |
| 28 | lamination film |
| 30 | illuminating device |
| 32 | light-coupling element |
| 34 | light-decoupling device |
| 36 | rib |
| 38 | rib |

The invention claimed is:

1. A vehicle window comprising:
a window body assembly having at least one window body, the window body assembly having an outer side facing the vehicle environment and an inner side facing the vehicle interior and a light-conducting layer forming the inner side;
an illuminating device configured to couple light into the light-conducting layer; and
a light-decoupling device configured to decouple light from the light-conducting layer in the direction of the vehicle interior,
wherein the light-decoupling device comprises transparent structural elements made of a polymer material and molded or connected to the inner side of the window body assembly by extrusion or foaming or injection molding or gluing.

2. The vehicle window according to claim 1, wherein the polymer material comprises a polyurethane material.

3. The vehicle window according to claim 1, wherein the structural elements comprise rib.

4. The vehicle window according to claim 3, wherein adjacent ribs have a distance of no more than 40 mm from each other.

5. The vehicle window according to claim 3, wherein the ribs each have a height of at least 2 mm and in particular at least 3.9 mm from the inner side of the window body assembly.

6. The vehicle window according to claim 3, wherein the ribs each have a width of at least 6 mm and in particular at least 6.9 mm.

7. The vehicle window according to claim 1, further comprising a light-coupling device which couples light of the illuminating device into the light-conducting layer via the inner side of the window body assembly.

8. The vehicle window according to claim 1, wherein the window body assembly comprises an outer window body and an inner window body, the inner window body forming the light-conducting layer and being connected to the outer window body via at least one connecting layer.

9. A vehicle window comprising:
a window body assembly having at least one window body, the window body assembly having an outer side facing the vehicle environment and an inner side facing the vehicle interior and a light-conducting layer forming the inner side;
an illuminating device configured to couple light into the light-conducting layer; and
a light-decoupling device configured to decouple light from the light-conducting layer in the direction of the vehicle interior,
wherein the light-decoupling device comprises transparent structural elements made of a polymer material and molded or connected to the inner side of the window body assembly by extrusion or foaming or injection molding or gluing,
wherein the structural elements comprise rib, and
wherein the ribs are parallel to each other.

* * * * *